(12) United States Patent
Sato et al.

(10) Patent No.: US 12,291,900 B2
(45) Date of Patent: May 6, 2025

(54) DOOR HANDLE APPARATUS

(71) Applicant: ALPS ALPINE CO., LTD., Tokyo (JP)

(72) Inventors: Wataru Sato, Miyagi (JP); Yuzuru Kawana, Miyagi (JP); Kazuhito Oshita, Miyagi (JP); Masaru Komatsu, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 238 days.

(21) Appl. No.: 18/056,362

(22) Filed: Nov. 17, 2022

(65) Prior Publication Data

US 2023/0079515 A1    Mar. 16, 2023

Related U.S. Application Data

(63) Continuation of application No. PCT/JP2021/019839, filed on May 25, 2021.

(30) Foreign Application Priority Data

Jun. 24, 2020   (JP) .................... 2020-108618

(51) Int. Cl.
  *E05B 81/76*   (2014.01)
  *E05B 85/10*   (2014.01)
  *E05B 79/06*   (2014.01)

(52) U.S. Cl.
  CPC .............. *E05B 81/76* (2013.01); *E05B 85/10* (2013.01); *E05B 79/06* (2013.01)

(58) Field of Classification Search
  CPC ........... E05B 85/10; E05B 81/76; E05B 79/06
  See application file for complete search history.

(56) References Cited

U.S. PATENT DOCUMENTS

| | | | | |
|---|---|---|---|---|
| 6,075,294 A | * | 6/2000 | Van den Boom | ....... E05B 81/78 340/541 |
| 8,502,099 B2 | * | 8/2013 | Lin | ........ H01H 13/26 200/302.2 |

(Continued)

FOREIGN PATENT DOCUMENTS

| | | | | |
|---|---|---|---|---|
| DE | 102015111311 A1 | * | 1/2017 | ............... E04B 1/66 |
| EP | 1108834 A2 | * | 6/2001 | ............. E05B 77/34 |

(Continued)

OTHER PUBLICATIONS

International Search Report for PCT/JP2021/019839 mailed on Jun. 29, 2021.

*Primary Examiner* — Carlos Lugo
(74) *Attorney, Agent, or Firm* — IPUSA, PLLC

(57) ABSTRACT

A door handle apparatus to be attached to a door of a vehicle is provided. The door handle apparatus includes a case, a strain body, and an elastic mechanism. The case includes an outer case provided so as to face a vehicle exterior side and an inner case provided so as to face a vehicle interior side. The outer case and the inner case are integrated with each other. The strain body is provided in the case, has a sensor mounted on a middle portion between one end portion and an opposite end portion of the strain body, and the one end portion of the strain body is fixed to a portion on a center side of the inner case. The elastic mechanism uses an elastic force to press the opposite end portion of the strain body against a fixing portion at an end of the inner case.

7 Claims, 12 Drawing Sheets

(56) References Cited

U.S. PATENT DOCUMENTS

| | | | | |
|---|---|---|---|---|
| 8,601,903 B1 * | 12/2013 | Klein | ............ | E05B 81/78 |
| | | | | 74/543 |
| 9,797,170 B2 * | 10/2017 | Savant | ............ | E05B 81/78 |
| 9,834,964 B2 * | 12/2017 | Van Wiemeersch | .... | E05B 85/10 |
| 2003/0029210 A1 * | 2/2003 | Budzynski | ............ | E05B 85/10 |
| | | | | 70/264 |
| 2003/0101781 A1 * | 6/2003 | Budzynski | ............ | E05B 85/10 |
| | | | | 70/239 |
| 2019/0186177 A1 | 6/2019 | Bussis et al. | | |
| 2021/0164281 A1 | 6/2021 | Takata et al. | | |

FOREIGN PATENT DOCUMENTS

| | | | | |
|---|---|---|---|---|
| EP | 1284334 A1 * | 2/2003 | ............ | E05B 77/36 |
| EP | 1284335 A1 * | 2/2003 | ............ | E05B 77/34 |
| JP | 2016-130392 | 7/2016 | | |
| JP | 2016-138845 | 8/2016 | | |
| WO | 2020/054103 | 3/2020 | | |

* cited by examiner

DOOR HANDLE APPARATUS

CROSS-REFERENCE TO RELATED APPLICATIONS

This application is a continuation of International Application No. PCT/JP2021/019839, filed on May 25, 2021 and designating the U.S., which claims priority to Japanese Patent Application No. 2020-108618, filed on Jun. 24, 2020. The contents of these applications are incorporated herein by reference in their entirety.

BACKGROUND OF THE INVENTION

1. Field of the Invention

The present invention relates to a door handle apparatus.

2. Description of the Related Art

For example, Patent Document 1 discloses a technique for unlocking or locking a door of a vehicle by detecting deformation of a substrate in a vehicle door handle with a pressure sensor, provided on the substrate in the door handle, when pressure is applied to the door handle.

RELATED-ART DOCUMENTS

Patent Documents

Patent Document 1: Japanese Laid-open Patent Publication No. 2016-130392

SUMMARY OF THE INVENTION

According to an embodiment, a door handle apparatus to be attached to a door of a vehicle is provided. The door handle apparatus includes a case, a strain body, and an elastic mechanism. The case includes an outer case provided so as to face a vehicle exterior side and an inner case provided so as to face a vehicle interior side. The outer case and the inner case are integrated with each other. The strain body is provided in the case, has a sensor mounted on a middle portion between one end portion and an opposite end portion of the strain body, and the one end portion of the strain body is fixed to a portion on a center side of the inner case. The elastic mechanism is configured to use an elastic force to press the opposite end portion of the strain body against a fixing portion at an end of the inner case.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
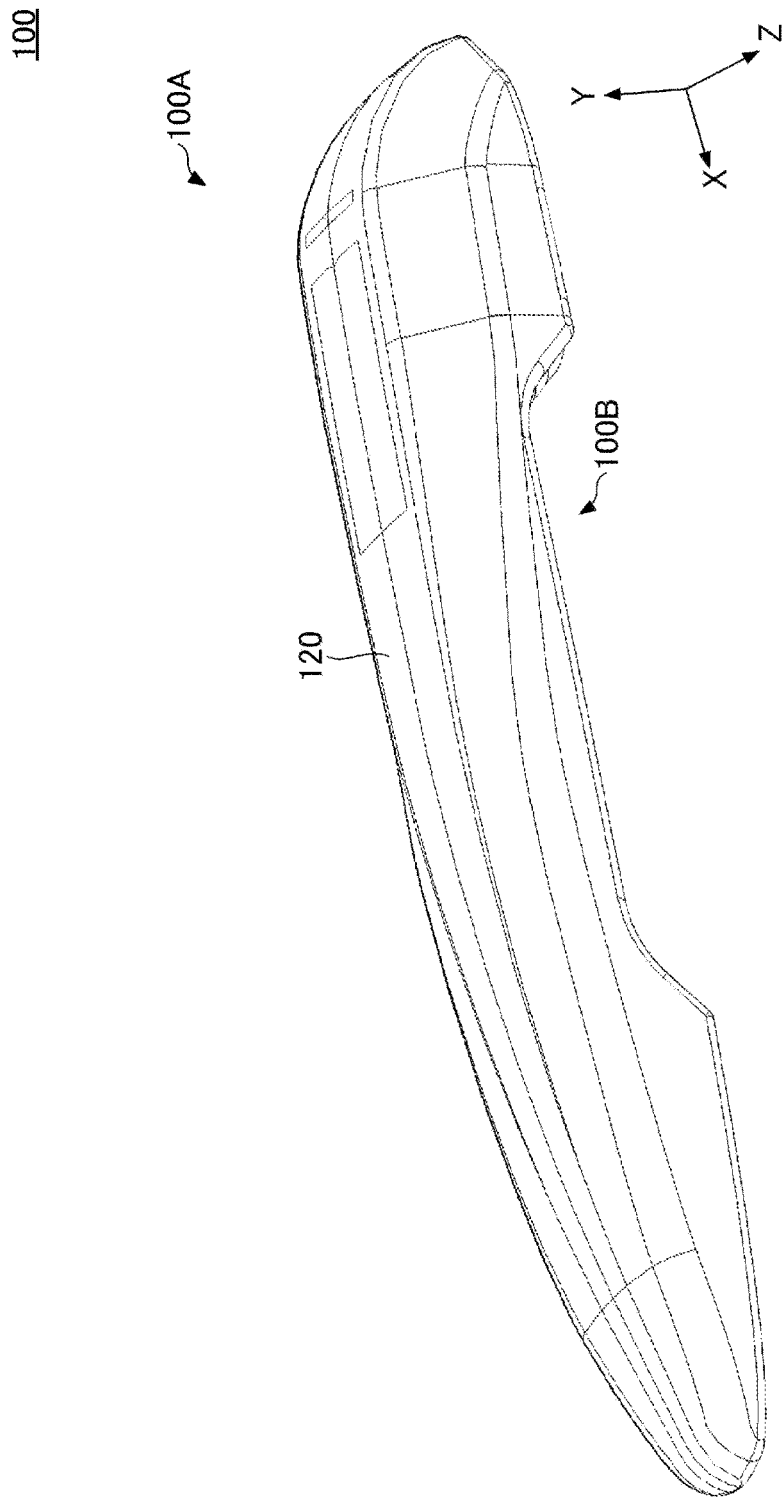
FIG. 1 is a perspective view of the exterior of a door handle apparatus according to an embodiment as viewed from the vehicle exterior side.

In the technique disclosed in Patent Document 1, because deformation of the substrate provided at the center in the longitudinal direction of the door handle is detected, the amount of deformation is relatively small, and thus, it is difficult to more securely detect pressure applied to the door handle.

In view of the above, the inventors of the present invention have found that there is a need for a technique by which pressure applied to the inner side of a door handle can be more securely detected. In particular, the inventors of the present invention have found that there is a need for a technique by which, while a strain sensor configured to detect a load applied to a door handle is employed, damage to the strain sensor can be prevented even if a significantly large load is applied to the door handle.

In the following, embodiments will be described with reference to the accompanying drawings. In the drawings, for the sake of convenience, a Z-axis direction (direction corresponding to the height direction of a vehicle) is referred to as a vertical direction, a Y-axis direction (direction corresponding to the width direction of the vehicle) is referred to as a lateral direction, and an X-axis direction (direction corresponding to the lengthwise direction of the vehicle) is referred to as a longitudinal direction. Further, in the drawings, a positive Y-axis side is referred to as an outer side or a vehicle exterior side, and a negative Y-axis side is referred to as an inner side or a vehicle interior side.

(Overview of Door Handle Apparatus 100)

Figure 2:
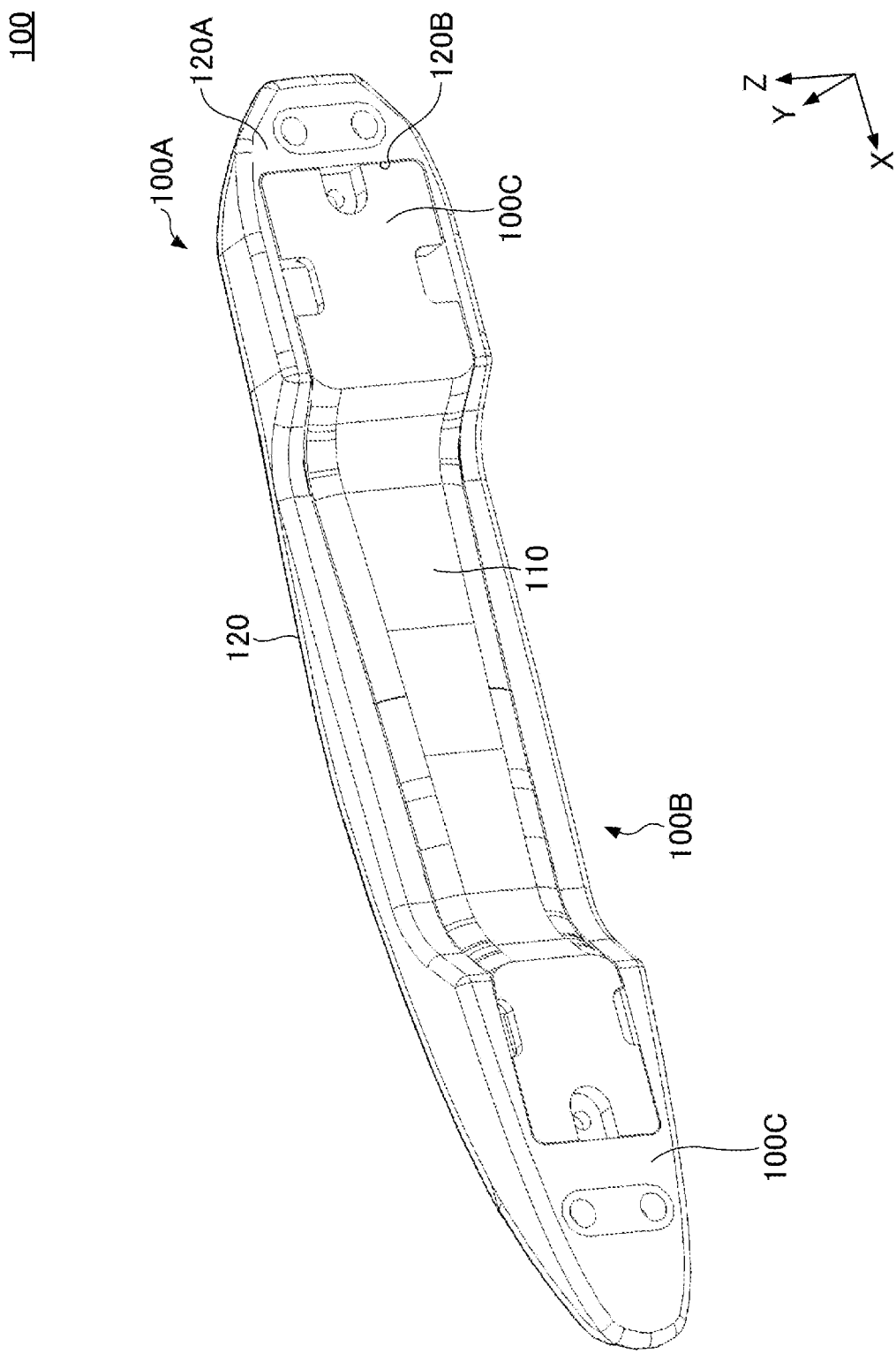
FIG. 2 is a perspective view of the exterior of the door handle apparatus according to the embodiment as viewed from the vehicle interior side.

FIG. 1 is a perspective view of the exterior of a door handle apparatus 100 according to an embodiment as viewed from the vehicle exterior side. FIG. 2 is a perspective view of the exterior of the door handle apparatus 100 according to the embodiment as viewed from the vehicle interior side. As illustrated in FIG. 1 and FIG. 2, the door handle apparatus 100 is an elongated rod-shaped component extending along the longitudinal direction (X-axis direction) of the vehicle. The door handle apparatus 100 is a component that is attached to a vehicle-exterior-side surface 20A (see FIG. 3) of a door 20 of the vehicle and is held by a user when the user opens and closes the door 20.

As illustrated in FIG. 1 and FIG. 2, the door handle apparatus 100 includes a case 100A. The case 100A forms the external shape of the door handle apparatus 100. The case 100A may be formed of a resin material such as an acrylonitrile butadiene styrene (ABS) resin or a polycarbonate (PC) resin. The case 100A has an inner case 110 on the vehicle interior side (negative Y-axis side) and an outer case 120 mainly on the vehicle exterior side (positive Y-axis side). Both the inner case 110 and the outer case 120 have an elongated shape extending in the longitudinal direction (X-axis direction) of the vehicle. The case 100A is formed by integrating the inner case 110 and the outer case 120 with each other.

As illustrated in FIG. 2, an opening 120B extending in the longitudinal direction (X-axis direction) is formed in a vehicle-interior-side surface 120A provided on the vehicle interior side (negative Y-axis side) of the outer case 120. The opening 120B has approximately the same shape as the outer shape of the inner case 110. The inner case 110 is fitted into the opening 120B.

A recess 100B that is recessed toward the vehicle exterior side (positive Y-axis side) is formed in the center on the vehicle interior side (negative Y-axis side) and in the longitudinal direction (X-axis direction) of the door handle apparatus 100. Two flat installation surfaces 100C are provided at respective end portions on the vehicle interior side (negative Y-axis side) and in the longitudinal direction (X-axis direction) of the door handle apparatus 100.

Figure 3:
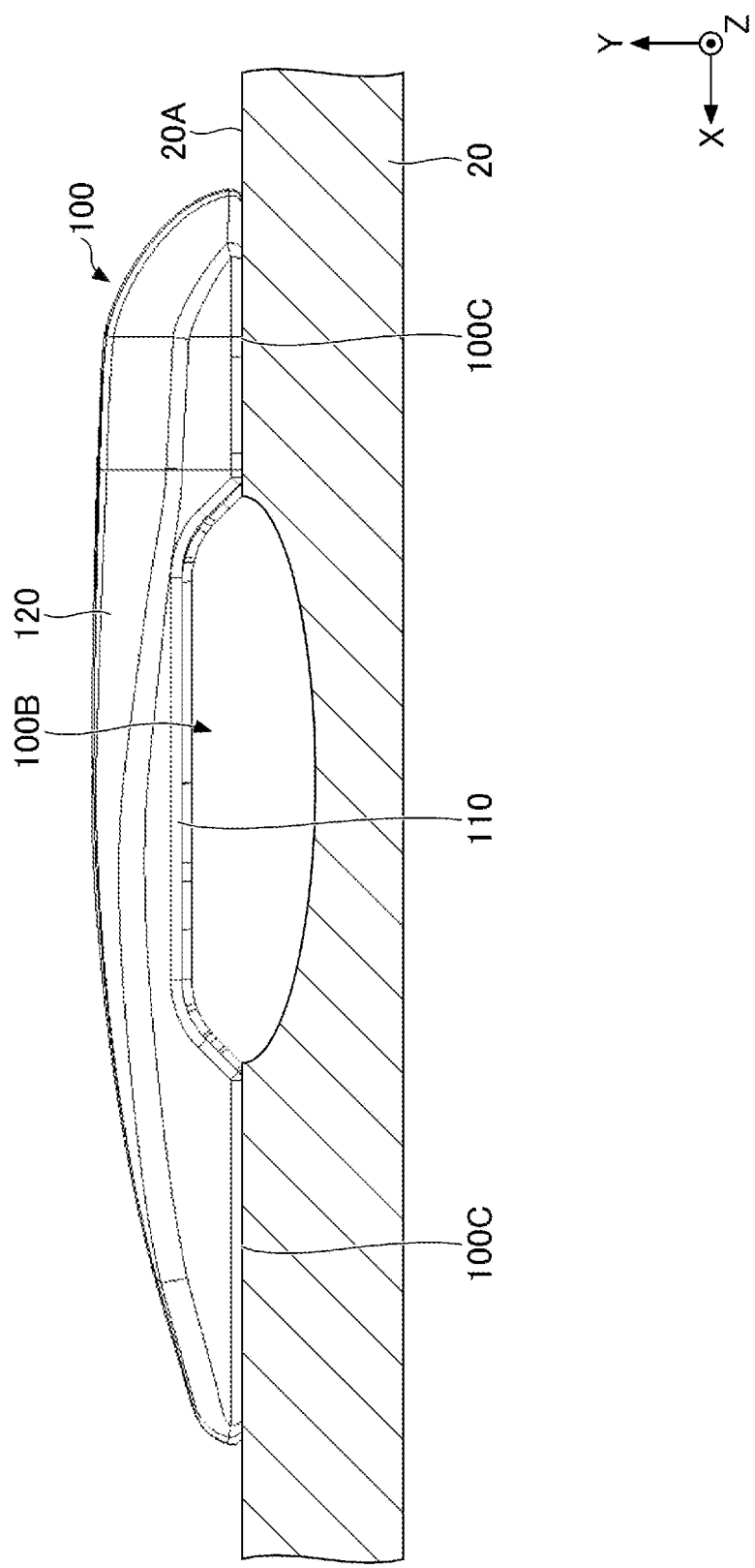
FIG. 3 is a diagram illustrating an installation state of the door handle apparatus according to the embodiment.

FIG. 3 is a diagram illustrating an installation state of the door handle apparatus 100 according to the embodiment. As illustrated in FIG. 3, the door handle apparatus 100 is screwed and fixed to the door 20, with the installation surfaces 100C being in contact with the vehicle-exterior-side surface 20A of the door 20.

As illustrated in FIG. 3, because the door handle apparatus 100 has the recess 100B, a space (see FIG. 3) that allows the user's hand to be inserted between the vehicle-exterior-side surface 20A of the door 20 and the door handle apparatus 100 is formed. Therefore, the door handle apparatus 100 can be held by the user's hand.

(Internal Configuration of Door Handle Apparatus 100)

Figure 4:
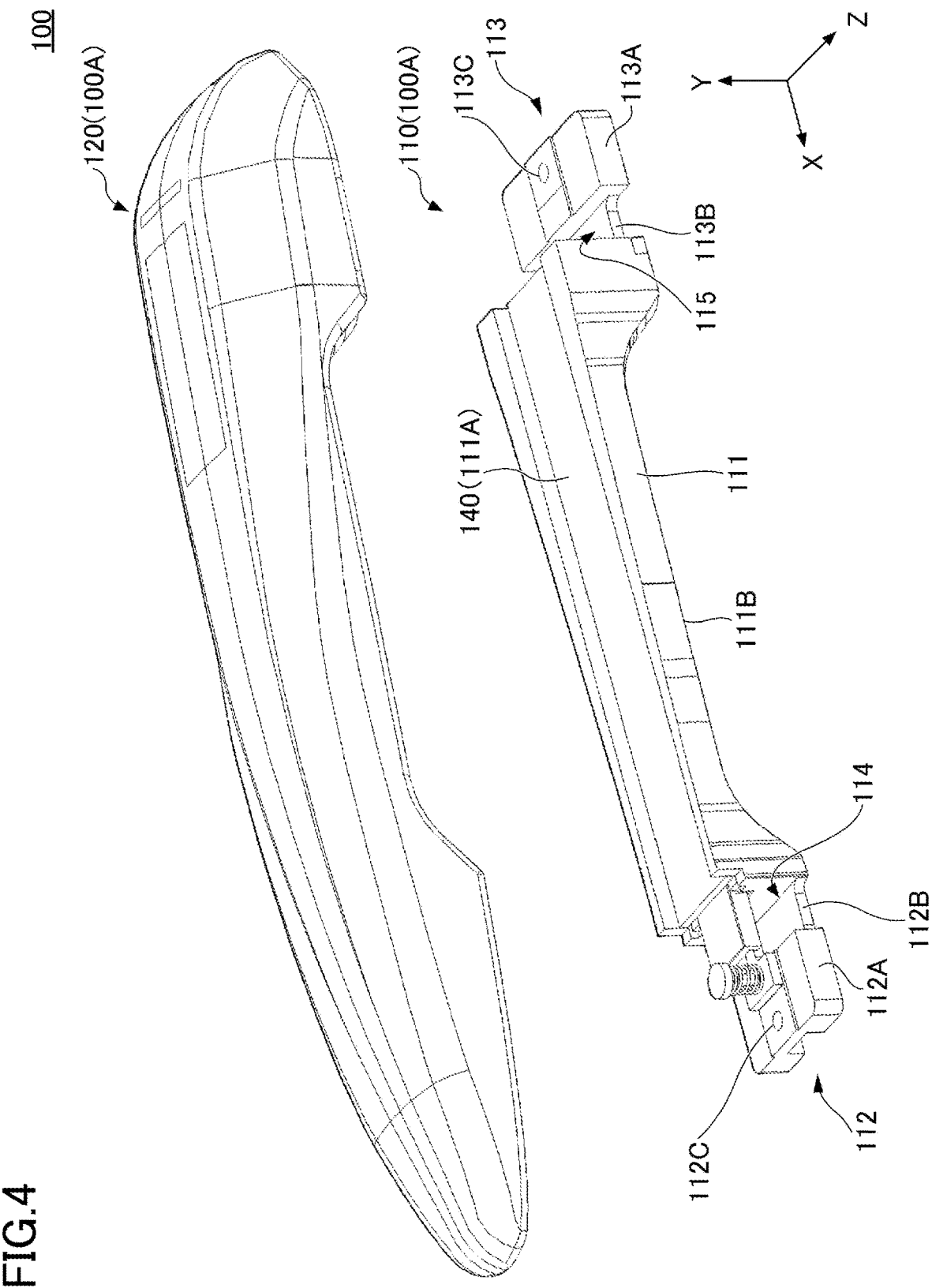
FIG. 4 is an exploded perspective view of the door handle apparatus according to the embodiment.
Figure 5:
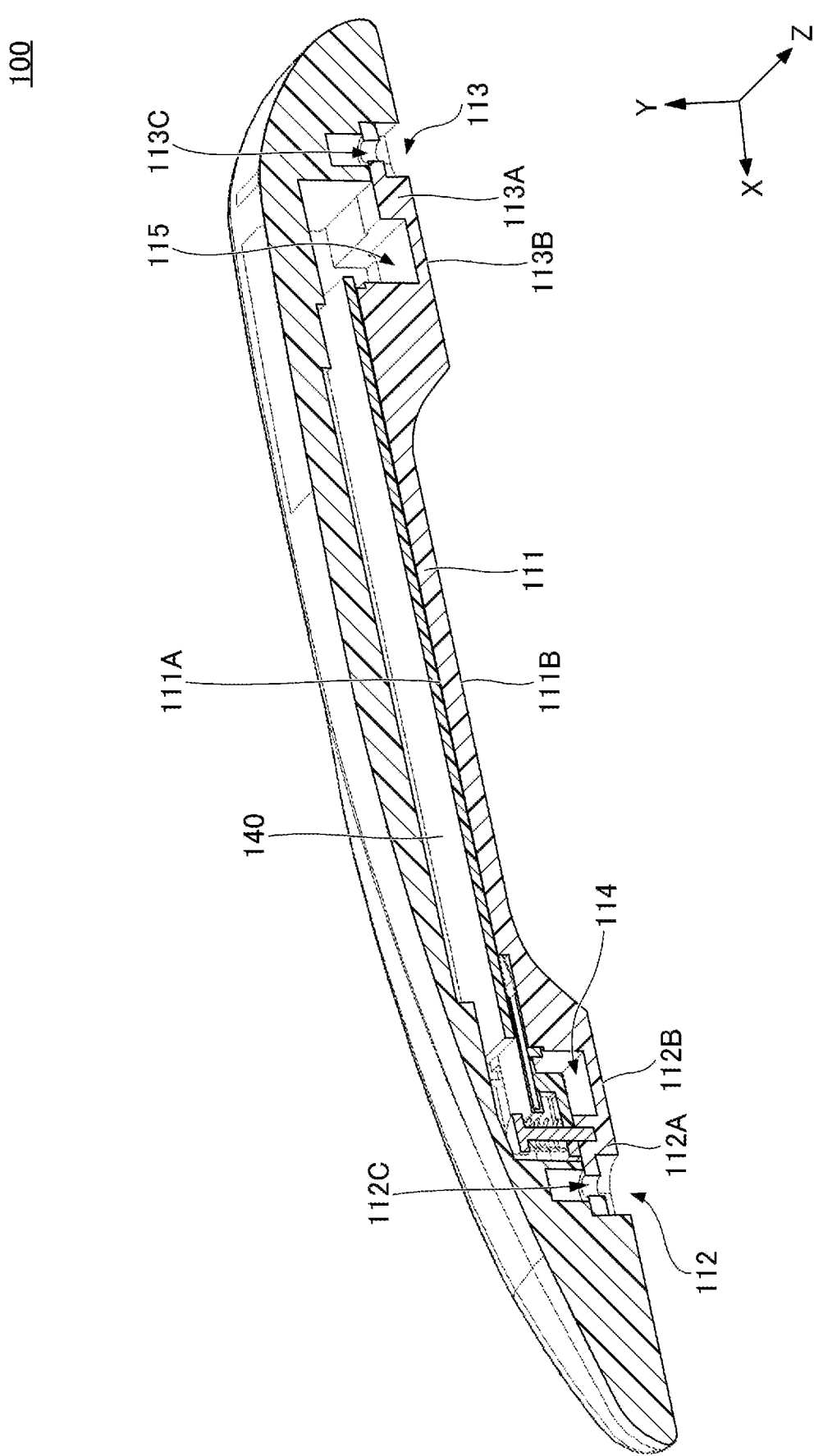
FIG. 5 is a cross-sectional view of the door handle apparatus according to the embodiment.

FIG. 4 is an exploded perspective view of the door handle apparatus 100 according to the embodiment. FIG. 5 is a cross-sectional view of the door handle apparatus 100 according to the embodiment. In FIG. 5, a cross section of the XY plane as viewed from an approximately oblique angle in the positive X-axis direction and in the positive Y-axis direction is depicted.

As illustrated in FIG. 4, the case 100A of the door handle apparatus 100 can be divided into the inner case 110 and the outer case 120. The inner case 110 is integrated with the outer case 120 by being fitted into the opening 120B formed in the outer case 120 and having approximately the same shape as the inner case 110. The inner case 110 includes a holding portion 111, a fixing portion 112, and a fixing portion 113.

The holding portion 111 is a portion provided at the center in the longitudinal direction (X-axis direction) of the inner case 110 and having an elongate shape extending in the longitudinal direction (the X-axis direction). The holding portion 111 is a portion to which a load is applied by the user's hand in a direction toward the outside of the vehicle (in the positive Y-axis) when the user opens the door 20. A vehicle-exterior-side surface 111A on the vehicle exterior side (positive Y-axis side) of the holding portion 111 has a flat shape. A capacitance sensor 140 is provided on the vehicle-exterior-side surface 111A. The capacitance sensor 140 has a thin, flat, rectangular shape and is elongated in the longitudinal direction (X-axis direction) as viewed from the vehicle exterior side in a plan view. The capacitance sensor 140 includes a detection electrode, and when the user's hand contacts the inner side of the door handle apparatus 100, the capacitance sensor 140 outputs a current value corresponding to the capacitance of the detection electrode as a contact detection signal. A vehicle-interior-side surface 111B of the holding portion 111 has a curved shape extending along the recess 100B (see FIG. 1 through FIG. 3) of the door handle apparatus 100, and forms a part of the recess 100B. The thickness of the holding portion 111 in the left-right direction (the Y-axis direction) decreases from both ends toward the center of the holding portion 111 in the longitudinal direction (the X-axis direction). Therefore, the both ends of the holding portion 111 have high rigidity and are less likely to deform.

The fixing portion 112 is a portion provided at a front end portion of the inner case 110 (at the end on the front side of the vehicle) in the longitudinal direction (the X-axis direction) and fixed to the outer case 120. The fixing portion 112 is a portion having approximately a flat plate shape and extending forward (toward the positive X-axis side) from a front end portion of the holding portion 111. The fixing portion 112 includes a pedestal portion 112A that is spaced apart from the front end portion of the holding portion 111. Therefore, in the fixing portion 112, a recess 114, which is partially recessed toward the vehicle interior side (negative Y-axis side), is formed between the holding portion 111 and the pedestal portion 112A. Further, the bottom surface of the recess 114 in the fixing portion 112 serves as a thin portion 112B that is thinner than the surrounding portions (the holding portion 111 and the pedestal portion 112A). Accordingly, the inner case 110 is readily elastically deformed locally in the thin portion 112B when a load is applied to the holding portion 111. A screw-fixing portion 112C is formed in the pedestal portion 112A of the fixing portion 112, and the fixing portion 112 is fixed to the outer case 120 by a screw through the screw-fixing portion 112C.

The fixing portion 113 is a portion provided at a rear end portion of the inner case 110 (at the end on the rear side of the vehicle) in the longitudinal direction (the X-axis direction) and fixed to the outer case 120. The fixing portion 113 has a symmetrical shape with the fixing portion 112 with respect to the YZ plane. The fixing portion 113 is a portion having approximately a flat plate shape and extending rearward (toward the negative X-axis side) from a rear end portion of the holding portion 111. The fixing portion 113 includes a pedestal portion 113A that is spaced apart from the rear end portion of the holding portion 111. Therefore, in the fixing portion 113, a recess 115, which is partially recessed toward the vehicle interior side (negative Y-axis side), is formed between the holding portion 111 and the pedestal portion 113A. Further, the bottom surface of the recess 115 in the fixing portion 113 serves as a thin portion 113B that is thinner than the surrounding portions (the holding portion 111 and the pedestal portion 113A). Accordingly, the inner case 110 is readily elastically deformed locally in the thin portion 113B when a load is applied to the holding portion 111. A screw-fixing portion 113C is formed in the pedestal portion 113A of the fixing portion 113, and the fixing portion 113 is fixed to the outer case 120 by a screw through the screw-fixing portion 113C.

<Detailed Configuration of Vicinity of Front End Portion of Inner Case 110>

Figure 6:
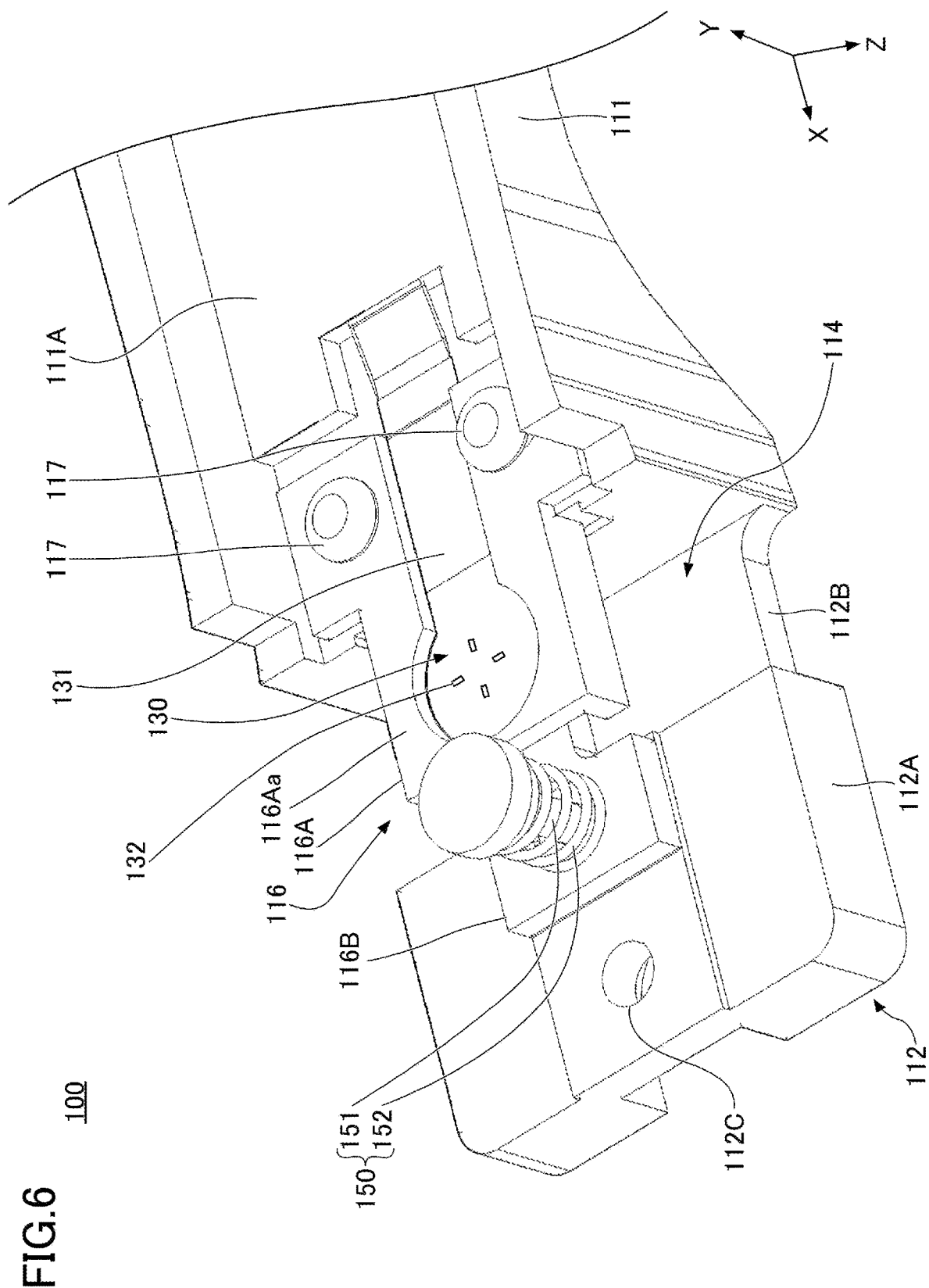
FIG. 6 is a partially enlarged perspective view of the vicinity of a front end portion of the door handle apparatus according to the embodiment.

A detailed configuration of the vicinity of a front end portion of the inner case 110 will be described with reference to FIG. 6 and FIG. 7. FIG. 6 is a partially enlarged perspective view of the vicinity of a front end portion of the door handle apparatus 100 according to the embodiment.

Figure 7:
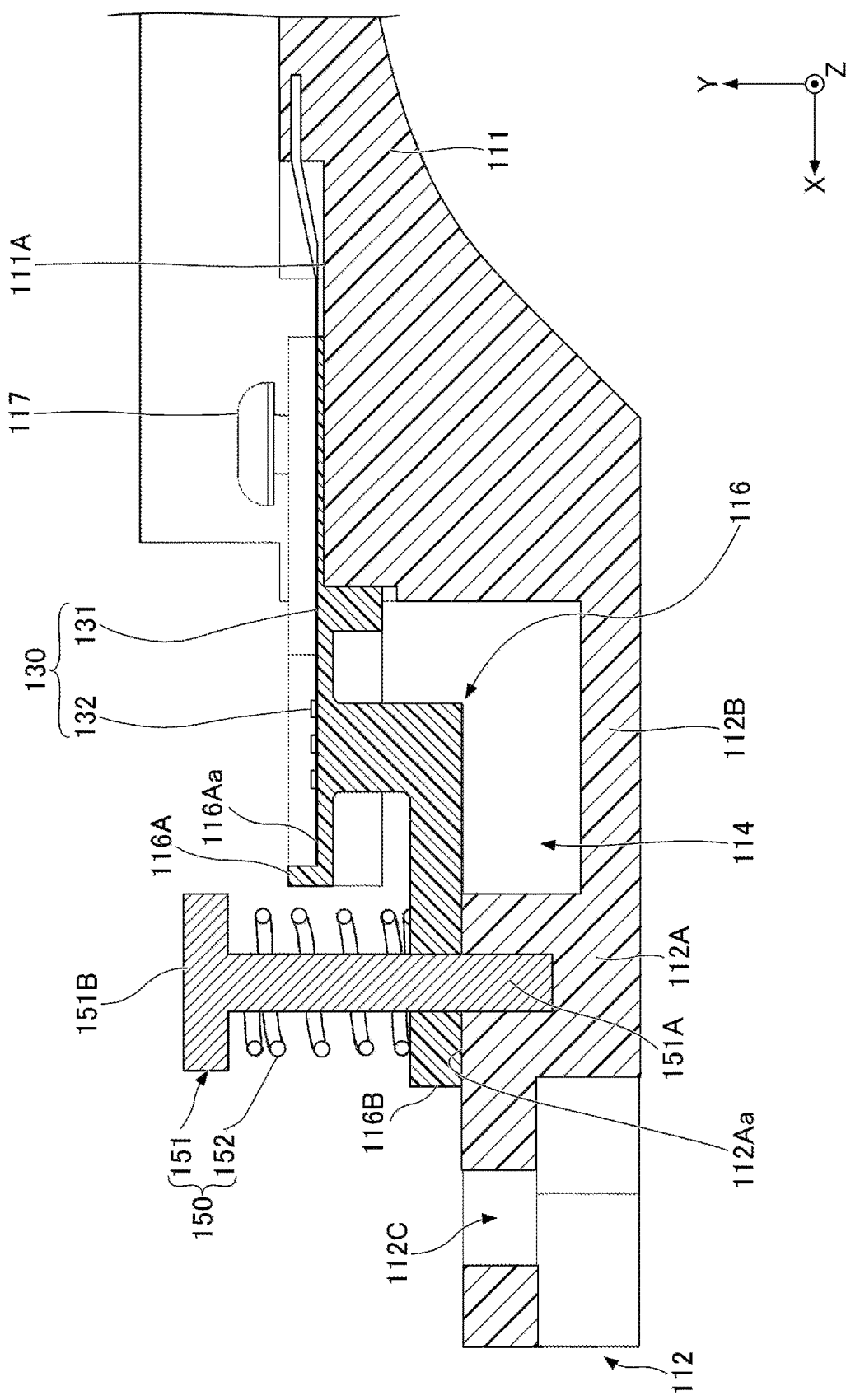
FIG. 7 is a partially enlarged cross-sectional view of the vicinity of the front end portion of the door handle apparatus according to the embodiment.

FIG. 7 is a partially enlarged cross-sectional view of the vicinity of the front end portion of the door handle apparatus 100 according to the embodiment.

As illustrated in FIG. 6 and FIG. 7, in the vicinity of the front end portion of the inner case 110, the recess 114 is formed between the holding portion 111 and the pedestal portion 112A as described above. Further, the bottom surface of the recess 114 serves as the thin portion 112B that is thinner than the surrounding portions (the holding portion 111 and the pedestal portion 112A).

An opening on the vehicle exterior side of the recess 114 is closed by a strain body 116. The strain body 116 is a flat-plate-shaped member that is approximately parallel to the XZ plane. The strain body 116 may be formed of, for example, a resin material or a metal material. A rear end portion of the strain body 116 is fixed to the vehicle-exterior-side surface 111A, which is a surface on the vehicle exterior side of the holding portion 111, by two fixing screws 117.

In the present embodiment, the strain body 116 includes a first flat plate portion 116A (an example of a "flat plate portion") and a second flat plate portion 116B (an example of a "connecting portion") whose positions in the Y-axis direction differ from each other. However, the configuration of the strain body 116 is not limited thereto, and the strain body 116 may include one flat plate portion.

The first flat plate portion 116A is a flat plate portion that is approximately at the same height as the vehicle-exterior-side surface 111A of the holding portion 111, extends forward (in the positive X-axis direction) relative to the vehicle-exterior-side surface 111A, and covers the opening on the vehicle exterior side of the recess 114. The rear end portion of the first flat plate portion 116A (that is, the rear end of the strain body 116) is fixed to the vehicle-exterior-side surface 111A by the two fixing screws 117. A strain sensor 130 is provided on a surface 116Aa on the vehicle exterior side of the first flat plate portion 116A.

The strain sensor 130 includes a flexible printed circuit (FPC) and four strain detection elements 132. The FPC 131 is a thin film-shaped wiring member that is bonded to the surface 116Aa by an adhesive, a double-sided tape, or the like. The four strain detection elements 132 are arranged on the same circumference at 90° intervals on the surface of the FPC 131. The resistance values of the four strain detection elements 132 change according to the amount of distortion of the first flat plate portion 116A, thereby allowing the strain detection elements 132 to detect the amount of distortion of the first flat plate portion 116A. The strain sensor 130 detects the amount of distortion of the first flat plate portion 116A by the four strain detection elements 132, and outputs a strain detection signal indicating the amount of distortion as a load detection signal indicating that a load is applied by the user's hand. Note that the number of strain detection elements 132 may be two or three or more.

The second flat plate portion 116B is a portion that overlaps a part of the first flat plate portion 116A at a position offset toward the vehicle interior side (negative Y-axis side) relative to the first flat plate portion 116A, and that has a flat plate shape extending in the longitudinal direction (the X-axis direction). A front end portion of the second flat plate portion 116B contacts a vehicle-exterior-side surface 112Aa on the vehicle exterior side of the pedestal portion 112A, and is pressed against the vehicle-exterior-side surface 112Aa by an elastic mechanism 150 as will be described later. A rear end portion of the second flat plate portion 116B is bent in an L-shape, and a square-pillar-shaped-portion thereof, whose center axis passes through the center of the four strain detection elements 132, is connected to the back surface (surface on the vehicle interior side) of the first flat plate portion 116A.

The elastic mechanism 150 is provided on the vehicle exterior side of the pedestal portion 112A. The elastic mechanism 150 includes a shaft 151 and a coil spring 152. The shaft 151 is a rod-shaped member having a large diameter. The shaft 151 is provided perpendicularly to the second flat plate portion 116B of the strain body 116 and the vehicle-exterior-side surface 112Aa of the pedestal portion 112A. The shaft 151 passes through the second flat plate portion 116B of the strain body 116, and the second flat plate portion 116B is guided by the shaft 151 so as to be movable in the Y-axis direction. An end portion 151A of the shaft 151 is embedded in and fixed to the vehicle-exterior-side surface 112Aa of the pedestal portion 112A. An end portion 151B of the shaft 151 has a large diameter, and is formed in a disc shape having a diameter larger than the outer diameter of the coil spring 152 such that the coil spring 152 does not fall off. For example, a bolt or the like may be used as the shaft 151.

The coil spring 152 is provided between the second flat plate portion 116B of the strain body 116 and the end portion 151B on the vehicle exterior side of the shaft 151 in a compressed state so as to be elastically deformable in the Y-axis direction. The shaft 151 passes through the center of the coil spring 152. The coil spring 152 uses an elastic force to preload the second flat plate portion 116B of the strain body 116 toward the vehicle interior side. Accordingly, the elastic mechanism 150 presses the second flat plate portion 116B of the strain body 116 against the vehicle-exterior-side surface 112Aa of the pedestal portion 112A.

(Operation of Door Handle Apparatus)

Figure 8:
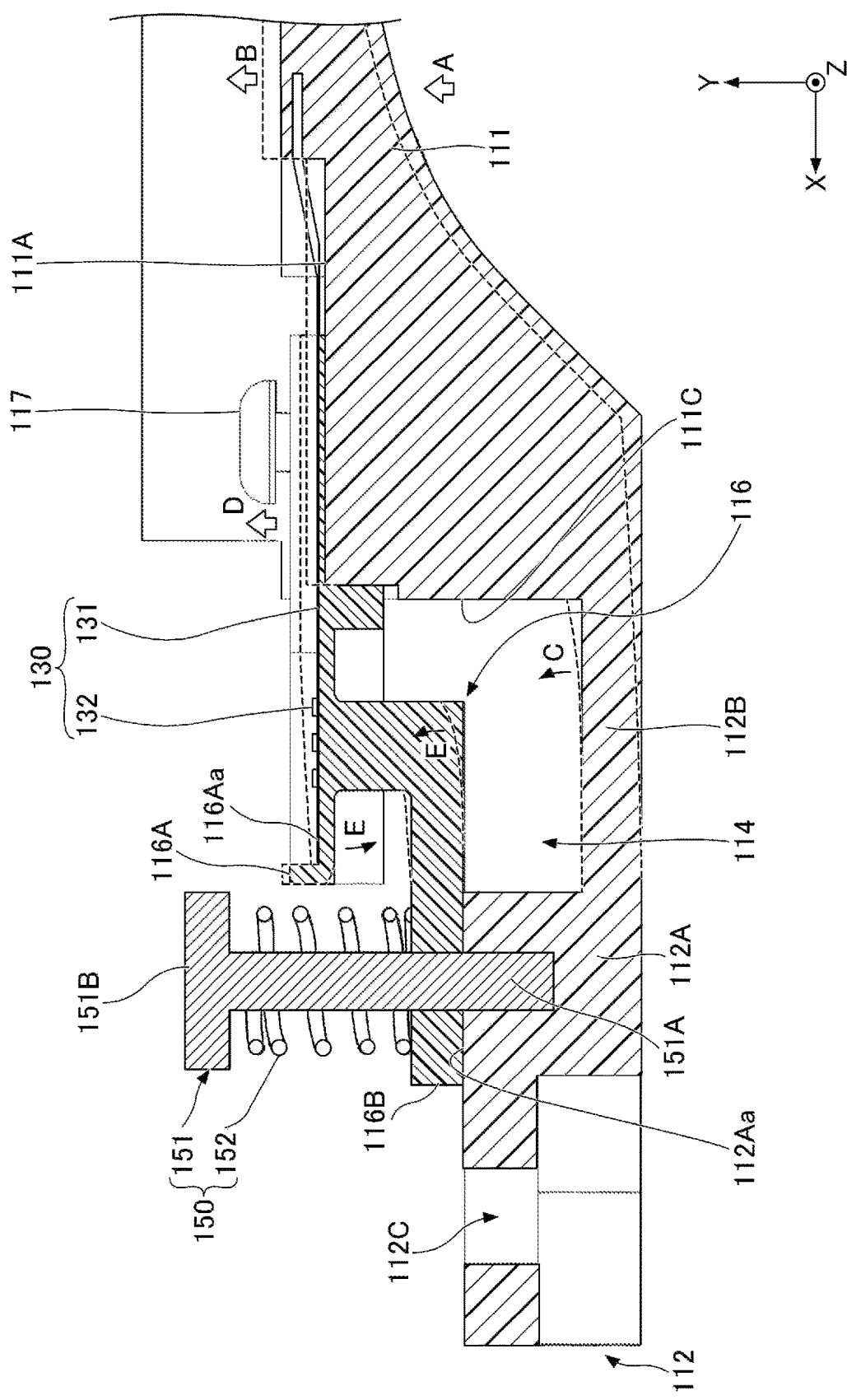
FIG. 8 is a diagram illustrating the operation of the door handle apparatus according to the embodiment.
Figure 9:
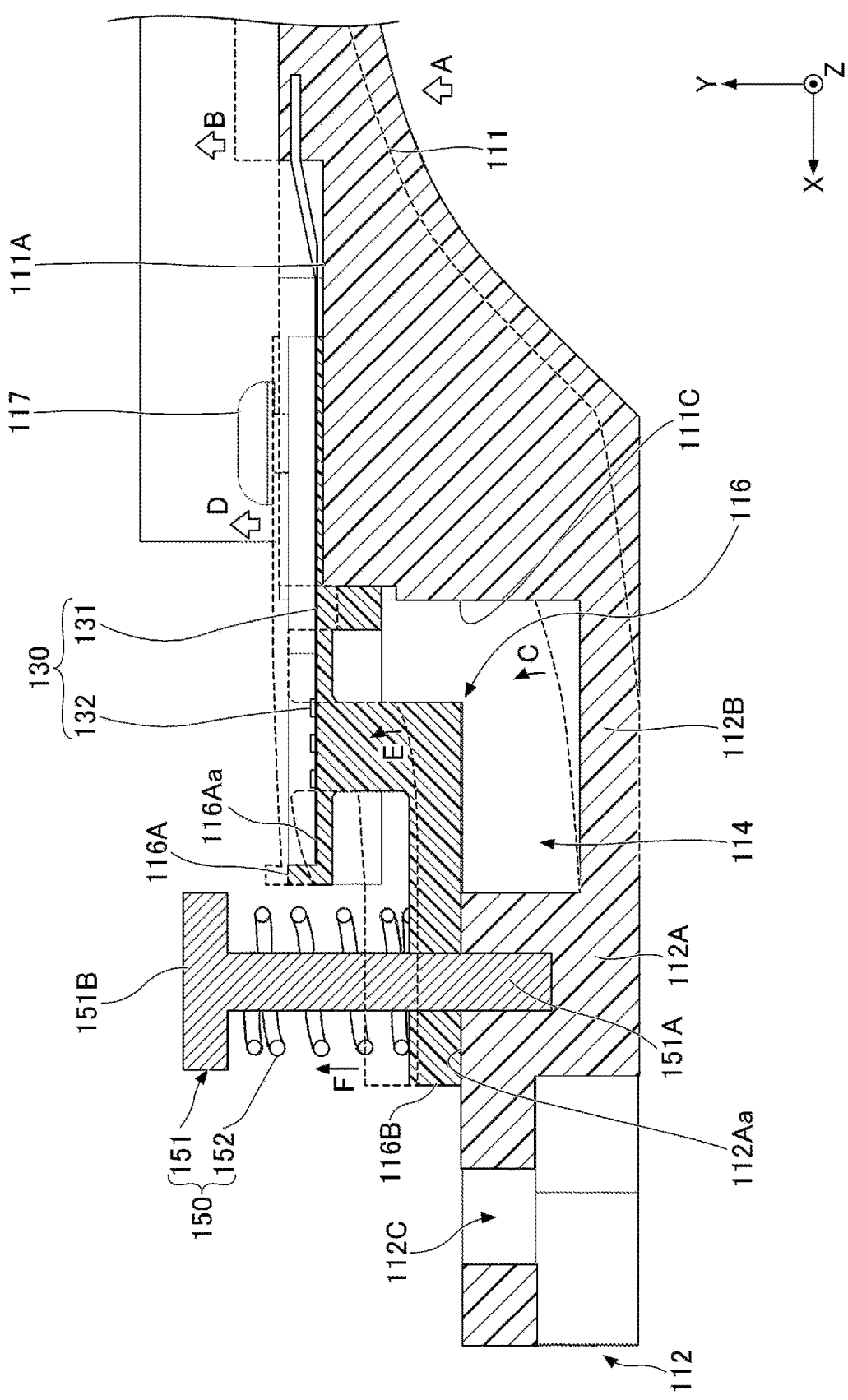
FIG. 9 is a diagram illustrating the operation of the door handle apparatus according to the embodiment.

FIG. 8 and FIG. 9 are diagrams illustrating the operation of the door handle apparatus 100 according to the embodiment. In the following, the operation of the door handle apparatus 100 when a load is applied to the holding portion 111 of the inner case 110 by the user's hand in a direction toward the outside of the vehicle (in the positive Y-axis direction) (as indicated by an arrow A in FIG. 8 and FIG. 9) will be described with reference to FIG. 8 and FIG. 9.

In this case, the holding portion 111 of the inner case 110 is elastically deformed according to the rigidity of the holding portion 111, which is set according to the material, the shape, and the like of the holding portion 111, and is displaced toward the outside of the vehicle by the elastic deformation (as indicated by an arrow B in FIG. 8 and FIG. 9). However, because the pedestal portion 112A of the inner case 110 has high rigidity and is fixed to the outer case 120, the pedestal portion 112A is not displaced. Therefore, in the inner case 110, the thin portion 112B between the holding portion 111 and the pedestal portion 112A is locally elastically deformed so as to deflect toward the outside of the vehicle (as indicated by an arrow C in FIG. 8 and FIG. 9). Note that, in practice, a side wall (a front end surface 111C) at the end in the X direction of the holding portion 111, which defines the recess 114, is tilted by elastic deformation of the thin portion 112B; however, because the effect is small, the description thereof will be omitted.

As described above, the rear end portion of the strain body 116 (first flat plate portion 116A) is fixed to the vehicle-exterior-side surface 111A of the holding portion 111. In addition, the front end portion of the strain body 116 (second flat plate portion 116B) is pressed against the pedestal portion 112A by the elastic mechanism 150.

Therefore, as illustrated in FIG. 8, when a load less than a predetermined value is applied to the holding portion 111 of the inner case 110 in a direction toward the outside of the vehicle, the rear end portion of the strain body 116 is displaced toward the outside of the vehicle (as indicated in an arrow D in FIG. 8), but the front end portion of the strain body 116 (second flat plate portion 116B) remains pressed against the pedestal portion 112A by the elastic mechanism 150. As a result, distortion occurs in a middle portion of the strain body 116 (including a portion, covering the recess 114, of the first flat plate portion 116A, and a portion, covering the recess 114, of the second flat plate portion 116B) (as indicated in arrows E in FIG. 8), and the distortion in the first flat plate portion 116A is detected by the strain sensor 130. In this case, the distortion in the middle portion of the strain body 116 is relatively small and does not damage the strain sensor 130.

That is, in the door handle apparatus 100 according to the embodiment, because the inner case 110 includes an elastic member, the amount of displacement in the strain body 116 can be decreased as compared to the amount of displacement in the holding portion 111 by disposing the strain body 116 at the end portion on the fixing portion 112 side of the inner case 110 in the longitudinal direction. In addition, in the door handle apparatus 100 according to the embodiment, the required amount of displacement can also be secured by forming the thin portion 112B. In the door handle apparatus 100 according to the embodiment, by appropriately setting the material and the shape of the inner case 110, the shape and the installation position of the strain body 116, and the like, the amount of displacement in the strain body 116 is controlled such that one-tenth of a load applied to the holding portion 111 is measured. In the door handle apparatus 100 according to the embodiment, both the second flat plate portion 116B and the first flat plate portion 116A are deformed; however, the first flat plate portion 116A may be mainly deformed.

Further, as illustrated in FIG. 9, when a load greater than the predetermined value is applied to the holding portion 111 of the inner case 110 in a direction toward the outside of the vehicle, the rear end portion of the strain body 116 is displaced toward the outside of the vehicle (as indicated in an arrow D in FIG. 9), and distortion occurs in a middle portion of the strain body 116 (as indicated in an arrow E in FIG. 9). In addition, the front end portion of the strain body 116 (second flat plate portion 116B) is also displaced toward the outside of the vehicle (as indicated in an arrow F in FIG. 9). This is because the force by which the front end portion of the strain body 116 (second flat plate portion 116B) pushes the coil spring 152 toward the outside of the vehicle overcomes the preload force of the coil spring 152 toward the inside of the vehicle. Accordingly, the amount of distortion in the middle portion of the strain body 116 can be reduced to the extent that the strain sensor 130 is not damaged.

The door handle apparatus 100 according to the embodiment is configured such that, when a load α is applied to the holding portion 111 (when the holding portion 111 is held by the user's hand with a relatively large force), a load β that is, for example, approximately one-tenth of the load α is applied to the strain sensor 130 as described above. That is, the spring constant of the coil spring 152 is designed such that the load β is reduced to the extent that the strain sensor 130 is not damaged (that is, the spring constant of the coil spring 152 is designed such that the second flat plate portion 116B compresses and moves the coil spring 152 toward the outside of the vehicle before the load β reaches the upper limit value).

Further, in the door handle apparatus 100 according to the embodiment, the capacitance sensor 140 detects the contact of the user's hand with the inner side of the door handle apparatus 100, or detects a position in the X direction of the inner side of the door handle apparatus 100 where the user's hand contacts. Further, in response to the user's hand pulling the door handle apparatus 100, the door handle apparatus 100 according to the embodiment detects a load applied to the strain sensor 130 by using the four strain detection elements 132 of the strain sensor 130. Then, if the load applied to the door handle apparatus 100 is greater than a predetermined value, the door handle apparatus 100 determines that the user has performed a pulling action. Note that a threshold for determining that the user has performed a pulling action is set within a load range in which the second flat plate portion 116B remains pressed against the pedestal portion 112A by the elastic mechanism 150. Further, calculation methods such as a contact detection method and a load detection method are known techniques, and thus, detailed descriptions thereof will not be provided.

As described above, the door handle apparatus 100 according to the embodiment is the door handle apparatus 100 to be attached to the door 20 of the vehicle, and includes a case A, the strain body 116, and the elastic mechanism 150. The case A is formed by integrating the outer case 120 provided on the vehicle exterior side with the inner case 110 provided on the vehicle interior side. The strain body 116 is provided in the case A, the strain sensor 130 is mounted between one end portion and the other end portion of the strain body 116, and the one end portion of the strain body 116 is fixed to a portion on the center side of the inner case 110. The elastic mechanism 150 is configured to use an elastic force to press the other end portion of the strain body 116 against the fixing portion 112 at the end of the inner case 110.

Accordingly, when a load is applied to the inner case 110 in a direction toward the outside of the vehicle, the door handle apparatus 100 according to the embodiment can cause local distortion in the middle portion between the one end portion and the other end portion of the strain body 116. Therefore, the door handle apparatus 100 according to the embodiment can securely detect the load applied to the inner case 110 (that is, applied to the inner side of the door handle apparatus 100) by detecting the local distortion in the middle portion of the strain body 116, using the strain sensor 130.

Further, in the door handle apparatus 100 according to the embodiment, when a load greater than a predetermined value is applied to the inner case 110 in a direction toward the outside of the vehicle, the other end portion of the strain body 116 can be displaced toward the outside of the vehicle against the preload force of the elastic mechanism 150. Therefore, the door handle apparatus 100 according to the embodiment can reduce the amount of distortion in the middle portion of the strain body 116, and thus, prevent the strain sensor 130 from being damaged.

Further, in the door handle apparatus 100 according to the embodiment, the second flat plate portion 116B of the strain body 116 is offset toward the vehicle interior side relative to the first flat plate portion 116A. Therefore, a sufficient space to dispose the elastic mechanism 150 can be secured on the vehicle exterior side of the second flat plate portion 116B.

In the present embodiment, the second flat plate portion 116B of the strain body 116 is elastically pressed against the fixing portion 112 by the elastic mechanism 150; however, the first flat plate portion 116A may be elastically pressed by the elastic mechanism 150. In this case, a more complicated structure than that of the present embodiment would be required because a surface for receiving the rear end portion of the first flat plate portion 116A would need to be provided on the positive Y-axis side of the holding portion 111, and further, the elastic mechanism 150 would need to be provided on the negative Y-axis side so as to elastically press the first flat plate portion 116A toward the positive Y-axis side.

(First Modification)

Figure 10:
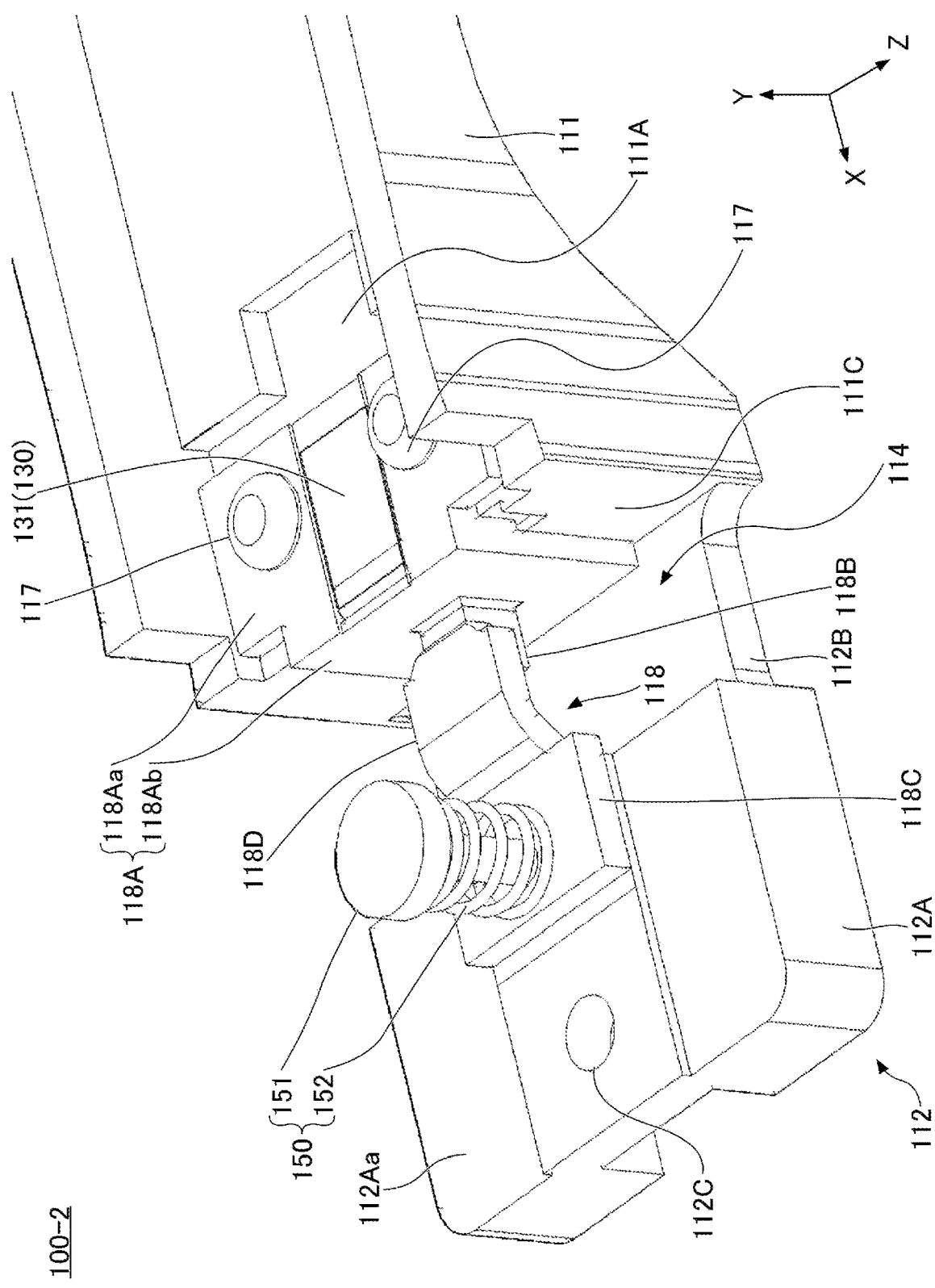
FIG. 10 is a partially enlarged perspective view of the vicinity of a front end portion of a door handle apparatus according to a first modification.
Figure 11:
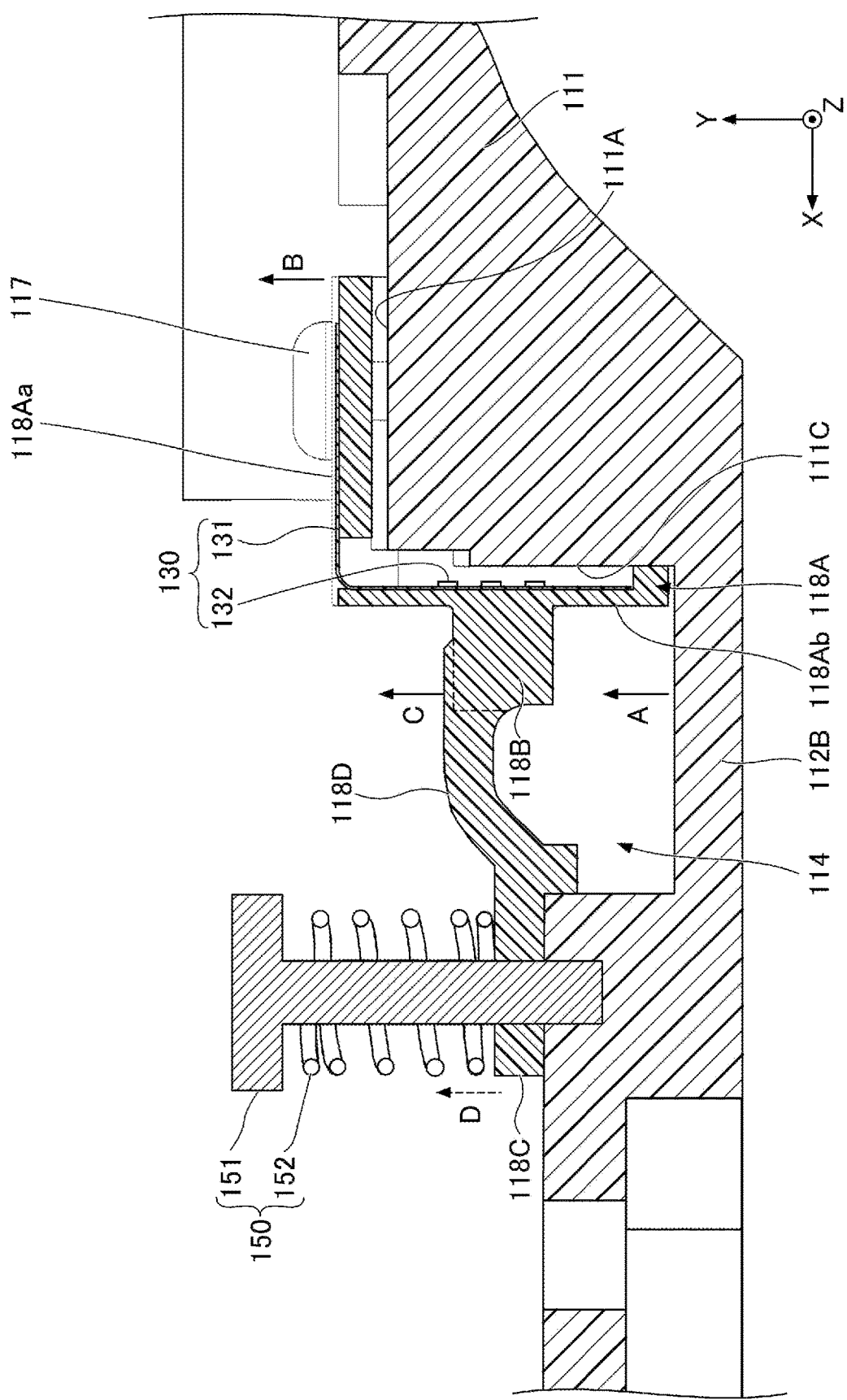
FIG. 11 is a partially enlarged cross-sectional view of the vicinity of the front end portion of the door handle apparatus according to the first modification.

FIG. 10 is a partially enlarged perspective view of the vicinity of a front end portion of a door handle apparatus 100-2 according to a first modification. FIG. 11 is a partially enlarged cross-sectional view of the vicinity of the front end portion of the door handle apparatus 100-2 according to the first modification. The door handle apparatus 100-2 according to the first modification illustrated in FIG. 10 and FIG. 11 includes a strain body 118 instead of the strain body 116.

The strain body 118 includes a base portion 118A, a pillar portion 118B, a flat plate portion 118C, and an arm portion 118D. The strain body 118 is formed of a resin material.

The base portion 118A is an L-shaped portion that is bent at a right angle at the front corner of the holding portion 111 (a right-angle corner formed by the vehicle-exterior-side surface 111A and the front end surface 111C). The base portion 118A includes a horizontal portion 118Aa extending along the vehicle-exterior-side surface 111A and a vertical portion 118Ab (an example of a "flat plate portion") extending along the front end surface 111C. The horizontal portion 118Aa of the base portion 118A is fixed to the vehicle-exterior-side surface 111A by two fixing screws 117.

As illustrated in FIG. 11, in the door handle apparatus 100-2, the FPC 131 of the strain sensor 130 is bent at a right angle and is disposed along the base portion 118A. The four strain detection elements 132 of the strain sensor 130 are fixed to the back surface (the surface on the negative X-axis side) of the vertical portion 118Ab. The four strain detection elements 132 are arranged on the same circumference, with the pillar portion 118B being centered, at 90° intervals as viewed from the front in a plan view.

In the example illustrated in FIG. 11, the FPC 131 is disposed along the back surface of the vertical portion 118Ab of the base portion 118A and along the front surface of the horizontal portion 118Aa of the base portion 118A. That is, the FPC 131 is exposed from the horizontal portion 118Aa of the base portion 118A. However, the FPC 131 may be disposed along the back surface of the horizontal portion 118Aa so as not to be exposed from the horizontal portion 118Aa of the base portion 118A.

The pillar portion 118B is a square-pillar-shaped portion that protrudes forward (in the positive X-axis direction) from the center of the vertical portion 118Ab. The flat plate portion 118C is a flat plate-shaped portion and is stacked on the vehicle-exterior-side surface 112Aa of the pedestal portion 112A. The flat plate portion 118C is pressed against the vehicle-exterior-side surface 112Aa by the elastic mechanism 150. The arm portion 118D connects a rear end portion of the flat plate portion 118C to a front end portion (a corner portion on the vehicle exterior side) of the pillar portion 118B. In the first modification, the pillar portion 118B, the arm portion 118D, and the flat plate portion 118C correspond to a "connecting portion".

In the door handle apparatus 100-2 according to the first modification, when a load is applied to the holding portion 111 of the inner case 110 by the user's hand in a direction toward the outside of the vehicle (in the positive Y-axis direction), the thin portion 112B of the inner case 110 is locally elastically deformed so as to deflect toward the outside of the vehicle (as indicated by an arrow A in FIG. 11) as described above.

As described above, the base portion 118A of the strain body 118 is fixed to the vehicle-exterior-side surface 111A of the holding portion 111. In addition, the flat plate portion 118C of the strain body 118 is pressed against the vehicle-exterior-side surface 112Aa of the pedestal portion 112A by the elastic mechanism 150.

Therefore, in the door handle apparatus 100-2 according to the first modification, when a load less than a predetermined value is applied to the holding portion 111 of the inner case 110 in a direction toward the outside of the vehicle, the base portion 118A of the strain body 118 is displaced toward the outside of the vehicle (as indicated by an arrow B in FIG. 11), but the flat plate portion 118C of the strain body 118 remains pressed against the pedestal portion 112A by the elastic mechanism 150. As a result, distortion occurs in a middle portion (including the pillar portion 118B, the arm portion 118D, and the vertical portion 118Ab) of the strain body 118 (as indicated by an arrow C in FIG. 11), and the distortion is detected by the strain sensor 130. In this case, the distortion in the middle portion of the strain body 118 is relatively small and does not damage the strain sensor 130.

Further, in the door handle apparatus 100-2 according to the first modification, when a load greater than the predetermined value is applied to the holding portion 111 of the inner case 110 in a direction toward the outside of the vehicle, the base portion 118A of the strain body 118 is displaced toward the outside of the vehicle (as indicated by the arrow B in FIG. 11), and distortion occurs in the middle portion of the strain body 118 (as indicated by the arrow C in FIG. 11). In addition, the flat plate portion 118C of the strain body 118 is also displaced toward the outside of the vehicle (as indicated by an arrow D in FIG. 11). This is because the force by which the flat plate portion 118C of the strain body 118 pushes the coil spring 152 toward the outside of the vehicle overcomes the preload force of the coil spring 152 toward the inside of the vehicle. Accordingly, the amount of distortion in the middle portion of the strain body 118 can be reduced to the extent that the strain sensor 130 is not damaged.

(Example of Additional Configuration of Strain Body 116)

Figure 12:
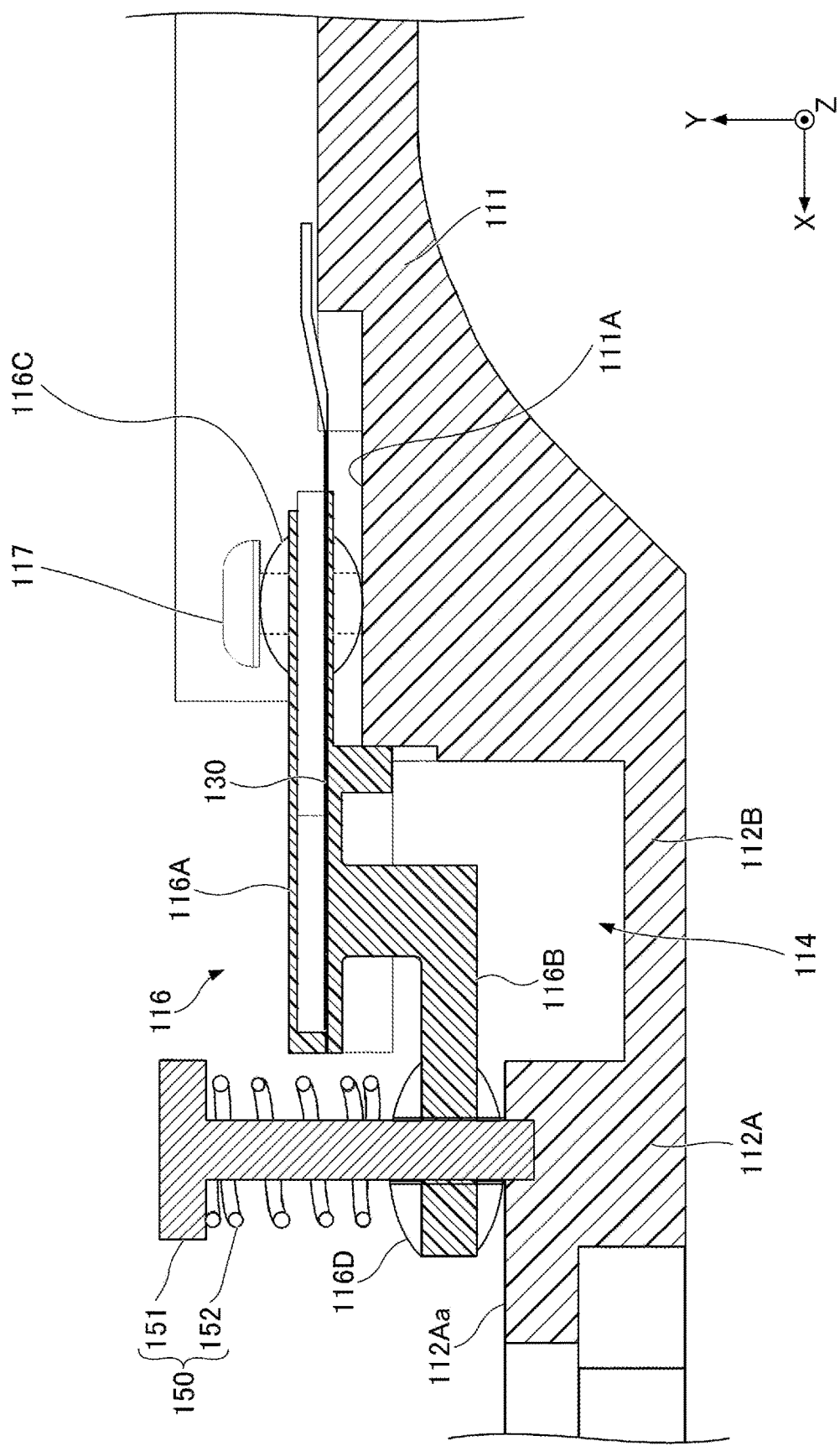
FIG. 12 is a diagram illustrating an example of an additional configuration of a strain body according to the embodiment.

FIG. 12 is a diagram illustrating an example of an additional configuration of the strain body 116. In the example illustrated in FIG. 12, the strain body 116 includes a first spherical portion 116C and a second spherical portion 116D.

The first spherical portion 116C is provided at the rear end portion of the first flat plate portion 116A of the strain body 116. The first spherical portion 116C is constituted by hemispherical-shaped portions that protrude toward the vehicle exterior side (positive Y-axis side) and the vehicle interior side (negative Y-axis side) relative to the first flat plate portion 116A. A fixing screw 117 passes through the first spherical portion 116C. With the first flat plate portion 116A being tilted, the first spherical portion 116C allows the first flat plate portion 116A to be fixed to the vehicle-exterior-side surface 111A by the fixing screw 117.

The second spherical portion 116D is provided at the front end portion of the second flat plate portion 116B of the strain body 116. The second spherical portion 116D is constituted by hemispherical-shaped portions that protrude toward the vehicle exterior side (positive Y-axis side) and the vehicle interior side (negative Y-axis side) relative to the second flat plate portion 116B. The shaft 151 passes through the second spherical portion 116D. With the second flat plate portion 116B being tilted, the second spherical portion 116D allows the second flat plate portion 116B to be pressed against the vehicle-exterior-side surface 112Aa by the coil spring 152.

According to the strain body 116 illustrated in FIG. 12, even when the strain body 116 is tilted due to the difference in height between the vehicle-exterior-side surface 111A and vehicle-exterior-side surface 112Aa, the tilt of the strain body 116 can be allowed by the first spherical portion 116C and the second spherical portion 116D. That is, according to the strain body 116 illustrated in FIG. 12, with the strain body 116 being tilted, the one end portion of the strain body 116 can be fixed to the vehicle-exterior-side surface 111A and the other end portion of the strain body 116 can be pressed against the vehicle-exterior-side surface 112Aa of the strain body 116 without the strain body 116 being distorted.

According to an embodiment, a load applied to the inner side of a door handle can be more securely detected, and damage of a strain sensor can be prevented even if a significantly large load is applied to the door handle.

Although specific embodiments have been described above, the present invention is not limited to the above-described embodiments. Variations and modifications may be made to the described subject matter without departing from the scope of the invention as set forth in the accompanying claims.

For example, the strain body does not necessarily have the shape described in the embodiment. That is, the strain body may have any shape as long as the strain sensor is mounted on a middle portion between one end portion and the other end portion of the strain body, the one end portion of the strain body is fixed to a portion on the center side of the inner case, and the other end portion of the strain body is pressed against the fixing portion at the end of the inner case.

Further, the elastic member is not necessarily the coil spring, and any other elastic member (such as rubber) may be used.

What is claimed is:

1. A door handle apparatus to be attached to a door of a vehicle, the door handle apparatus comprising:
   a case including an outer case so as to face a vehicle exterior side and an inner case provided so as to face a vehicle interior side, the outer case and the inner case being integrated with each other, said inner case including first and second fixing portions configured to attach the inner case to the door, a holding portion located between the first and second fixing portions, and a thin portion between the first fixing portion and the holding portion that is thinner than surrounding portions;
   a strain body provided on the inner case and having a sensor mounted on a middle portion between one end portion and an opposite end portion of the strain body, the one end portion of the strain body being fixed to a portion of the inner case that is closer to the holding portion of the inner case in a longitudinal direction relative to the thin portion; and
   an elastic mechanism configured to fix the opposed end portion of the strain body to another portion of the inner case, and allowing movement of the opposed end portion in a direction orthogonal to the longitudinal direction, said elastic mechanism being configured to use an elastic force to press the opposite end portion of the strain body against a fixing portion at an end of the inner case.

2. The door handle apparatus according to claim 1, wherein the inner case includes a holding portion at the center of the inner case, the one end portion of the strain body is arranged outward relative to the holding portion in the longitudinal direction of the inner case, and the opposite end portion of the strain body is arranged outward relative to the one end portion of the strain body in the longitudinal direction of the inner case, and wherein the elastic mechanism causes the opposite end portion of the strain body to be spaced apart from the fixing portion of the inner case towards the vehicle exterior side by being elastically deformed when a load greater than a predetermined value is applied to the inner case.

3. The door handle apparatus according to claim 1, wherein the elastic mechanism includes an elastic member configured to preload the opposite end portion of the strain body against the fixing portion of the inner case from the vehicle exterior side.

4. The door handle apparatus according to claim 3, wherein the strain body includes
   a flat plate portion on which the strain sensor is provided, and
   a connecting portion whose one end is connected to the flat plate portion and other end is pressed against the fixing portion by the elastic mechanism.

5. The door handle apparatus according to claim 3, wherein the opposite end portion of the strain body is offset toward the vehicle interior side relative to the one end portion of the strain body.

6. A door handle apparatus to be attached to a door of a vehicle, the door handle apparatus comprising:
   a case including an outer case so as to face a vehicle exterior side and an inner case provided so as to face a vehicle interior side, the outer case and the inner case being integrated with each other, said inner case including first and second fixing portions configured to attach the inner case to the door, a holding portion located between the first and second fixing portions, and a thin portion between the first fixing portion and the holding portion that is thinner than surrounding portions;
   a strain body provided on the inner case and having a sensor mounted on a middle portion between one end portion and an opposite end portion of the strain body, the one end portion of the strain body being fixed to a portion of the inner case that is closer to the holding portion of the inner case in a longitudinal direction relative to the thin portion; and
   an elastic mechanism configured to fix the opposed end portion of the strain body to another portion of the inner case, and allowing movement of the opposed end portion in a direction orthogonal to the longitudinal direction, said elastic mechanism being configured to use an elastic force to press the opposite end portion of the strain body against a fixing portion at an end of the inner case,
   wherein the elastic mechanism includes an elastic member configured to preload the opposite end portion of the strain body against the fixing portion of the inner case from the vehicle exterior side,
   wherein the elastic mechanism includes
   a coil spring as the elastic member, and
   a shaft configured to pass through the coil spring and the opposite end portion of the strain body, and to be fixed to the fixing portion of the inner case.

7. A door handle apparatus to be attached to a door of a vehicle, the door handle apparatus comprising:
   a case including an outer case so as to face a vehicle exterior side and an inner case provided so as to face a vehicle interior side, the outer case and the inner case being integrated with each other, said inner case including first and second fixing portions configured to attach the inner case to the door, a holding portion located between the first and second fixing portions, and a thin portion between the first fixing portion and the holding portion that is thinner than surrounding portions;

a strain body provided on the inner case and having a sensor mounted on a middle portion between one end portion and an opposite end portion of the strain body, the one end portion of the strain body being fixed to a portion of the inner case that is closer to the holding portion of the inner case in a longitudinal direction relative to the thin portion; and an elastic mechanism configured to fix the opposed end portion of the strain body to another portion of the inner case, and allowing movement of the opposed end portion in a direction orthogonal to the longitudinal direction, said elastic mechanism being configured to use an elastic force to press the opposite end portion of the strain body against a fixing portion at an end of the inner case, wherein the strain body includes a first spherical portion configured to fix the one end portion of the strain body to the portion on the center side of the inner case, with the strain body being tilted, and a second spherical portion configured to press the opposite end portion of the strain body against the fixing portion of the inner case, with the strain body being tilted.

* * * * *